United States Patent [19]

Richmond et al.

[11] Patent Number: 6,100,838
[45] Date of Patent: Aug. 8, 2000

[54] MULTIPLE SOURCE JAMMING SIGNAL CANCELLATION SYSTEM

[75] Inventors: Martin R. Richmond, Lexington, Mass.; Alfred J. Cann, Wilton, N.H.

[73] Assignee: Lockheed Martin Corporation, Nashua, N.H.

[21] Appl. No.: 05/589,490

[22] Filed: Jun. 16, 1975

[51] Int. Cl.[7] .................................................. G01S 7/36
[52] U.S. Cl. ............................................. 342/17; 455/303
[58] Field of Search ........................... 343/18 E; 325/474, 325/475; 342/17; 455/296, 303

[56] References Cited

U.S. PATENT DOCUMENTS

| | | | |
|---|---|---|---|
| 3,011,053 | 11/1961 | Sev | 325/474 X |
| 3,226,646 | 12/1965 | Ludwig | 325/475 |
| 3,456,198 | 7/1969 | Black | 325/475 |
| 3,769,591 | 10/1973 | Brown et al. | 325/474 |
| 3,896,442 | 7/1975 | Heminway et al. | 343/18 E |

*Primary Examiner*—Gilberto Barron, Jr.
*Attorney, Agent, or Firm*—David W. Gomes

[57] ABSTRACT

Suppression of jamming from multiple sources is achieved by detecting the AM difference frequency produced by the beating of a desired signal and the smaller of the multiple jamming signal with the stronger jamming signal and applying same to one input of a single-sideband modulator while simultaneously applying the received signal (containing both the desired signal and the jamming signals) to the other input to the single-sideband modulator whereby the larger jamming signal is suppressed. The sum and difference outputs of the single-sideband modulator containing the upper and lower sidebands, respectively, of the desired signal plus the smaller jamming signal are each processed by a jamming cancellation circuit to suppress the smaller jamming signal and their outputs combined to receive the desired signal.

12 Claims, 4 Drawing Sheets

MULTIPLE SOURCE JAMMING SIGNAL CANCELLATION SYSTEM

BACKGROUND OF THE INVENTION

This invention relates to a jamming cancellation system and more particularly to a multiple source jamming cancellation system.

An important consideration in the design of radar systems, particularly those for military applications, is the provision of means for recovering the radar signal from a total signal which includes noise jamming signals of higher intensity than that of the radar signal itself. Most noise jammers consist of an oscillator which is frequency modulated by a noisy waveform at a high rate. The rates are high enough to shock excite the victim radar i.f. amplifier so that its output is indistinguishable from true random noise.

Various techniques to cancel jamming signal and thus recover the desired signal have been proposed. For example, patent applications for three such jamming signal cancellation systems have been filed: Ser. No. 509,158, filed Sep. 24, 1974 now U.S. Pat. No. 5,363,104; Ser. No. 446,570, filed Feb. 21, 1974 abandoned and Ser. No. 491,587, filed Jul. 22, 1974 pending, all assigned to the assignee of this application. For illustration purposes one of these applications will be considered, namely Ser. No. 509,158.

In that application improved desired signal detection is achieved by detecting the AM difference frequency produced by the beating of the desired signal with the jamming signal and applying same to one input of a balanced modulator while simultaneously applying the received signal (containing both the desired signal and the jamming signal) to the other input of the balanced modulator whereby the output from the balanced modulator contains the desired signal but not the jamming signal. Actually, the video signal applied to the balanced modulator causes double-sideband suppressed-carrier modulation of the jamming signal. As a result the balanced modulator output contains two frequencies: one is the desired signal; the other is an image on the other side of the jamming frequency and frequency modulated with twice the deviation of the jammer. The image is outside the passband of the radar receiver and thus, only the desired signal is processed.

This single stage device and those of the other aforementioned patent applications only remove the strongest jammer signal. If a weaker jamming signal is also present, it is preserved in its original ratio to the desired signal. Therefore, the apparent improvement factor can never exceed the ratio of the two jammer powers and it generally runs a few dB less.

To solve this problem of multiple jammers, one can, in principle, cascade two of such cancellation systems, let the first one take out the stronger jammer and let the second one take out the weaker jammer, leaving the desired signal. In reality the solution is somewhat more complex since, as mentioned, the cancellation system produces an image of every signal at the output of the first cancellation system, therefore the weaker jammer signal is accompanied by its image. Applying this to the second cancellation system would be equivalent to applying two jammers of equal strength and the second cancellation system cannot cope with this problem.

SUMMARY OF THE INVENTION

Accordingly, it is an object of this invention to provide improved means for reducing the effects of "noise" jamming.

It is another object of this invention to provide improved signal detection performance in a jamming environment.

It is a further object of this invention to provide means for reducing the effects of multiple jammers on signal detection.

Briefly, in one embodiment the signal received at an antenna, which consists of a desired signal and two higher intensity jamming signals, is amplitude standardized by, for example, conventional AGC techniques, and split into two channels. One channel includes an AM detector, a high-pass filter and a video amplifier. The AM detector detects the difference fre quencies produced by the beating of the desired radar signal and the weaker jamming signal with the stronger jamming signal. The other channel may include a delay line.

The outputs from the delay line and video amplifier are coupled to the two inputs of a single-sideband modulator whose sum and difference outputs contain the desired signal and the smaller jamming signal with the larger jamming signal suppressed. These outputs, which contain the upper and lower sidebands of the desired signal plus the smaller jamming signal, are processed by two jamming cancellation circuits to suppress the smaller jamming signal and their outputs are combined to provide recovery of the desired signal.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
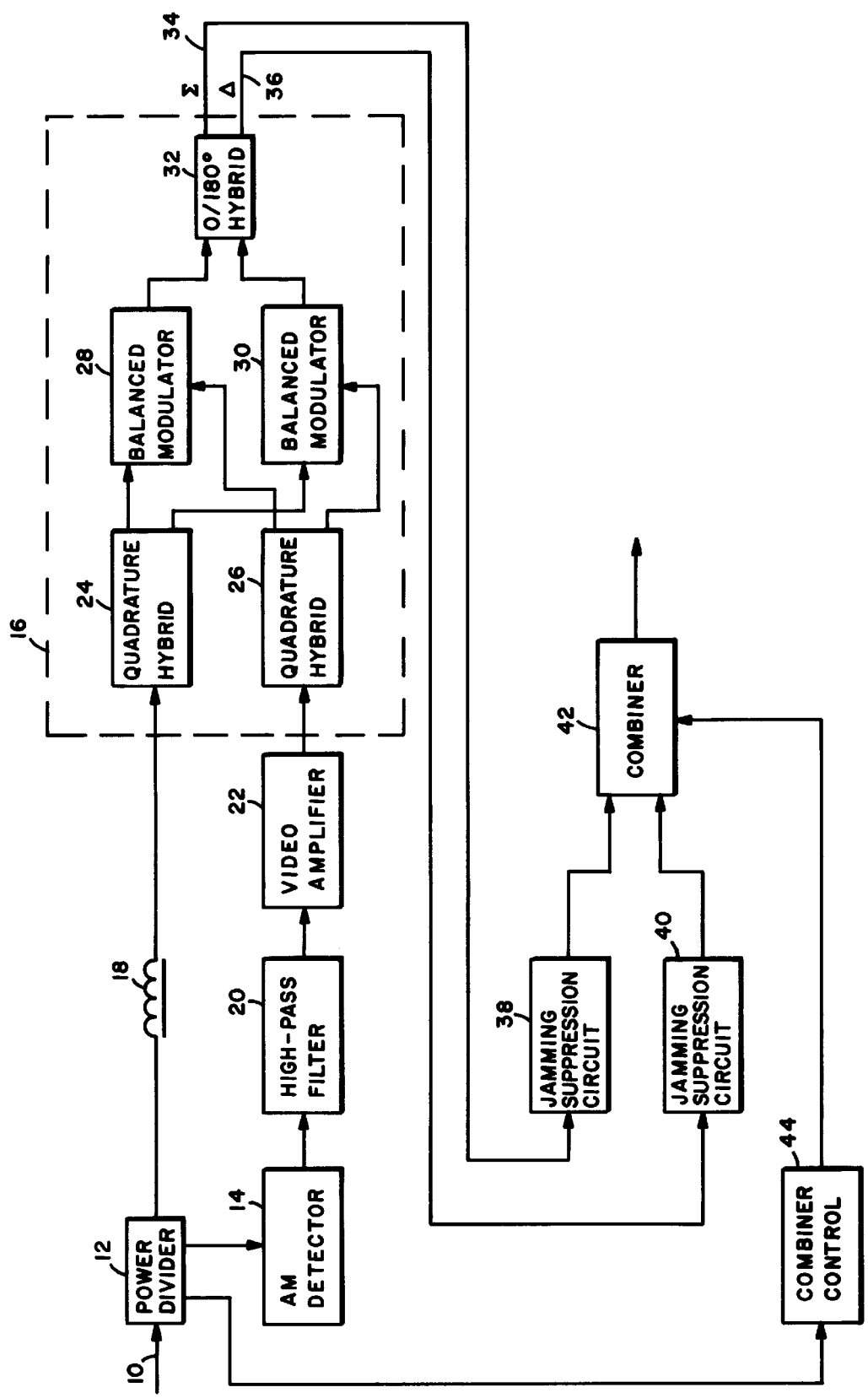
FIG. 1 is a simplified block diagram of an embodiment of the invention.

Referring now to FIG. 1, there is illustrated thereby a system for cancelling the effects of multiple jammers, and in particular two jammers, from any signal detection system. The system of FIG. 1 has been simplified for instructional purposes and components thereof such as automatic gain control which are unnecessary for the tutorial discussion have been omitted.

Figure 2:
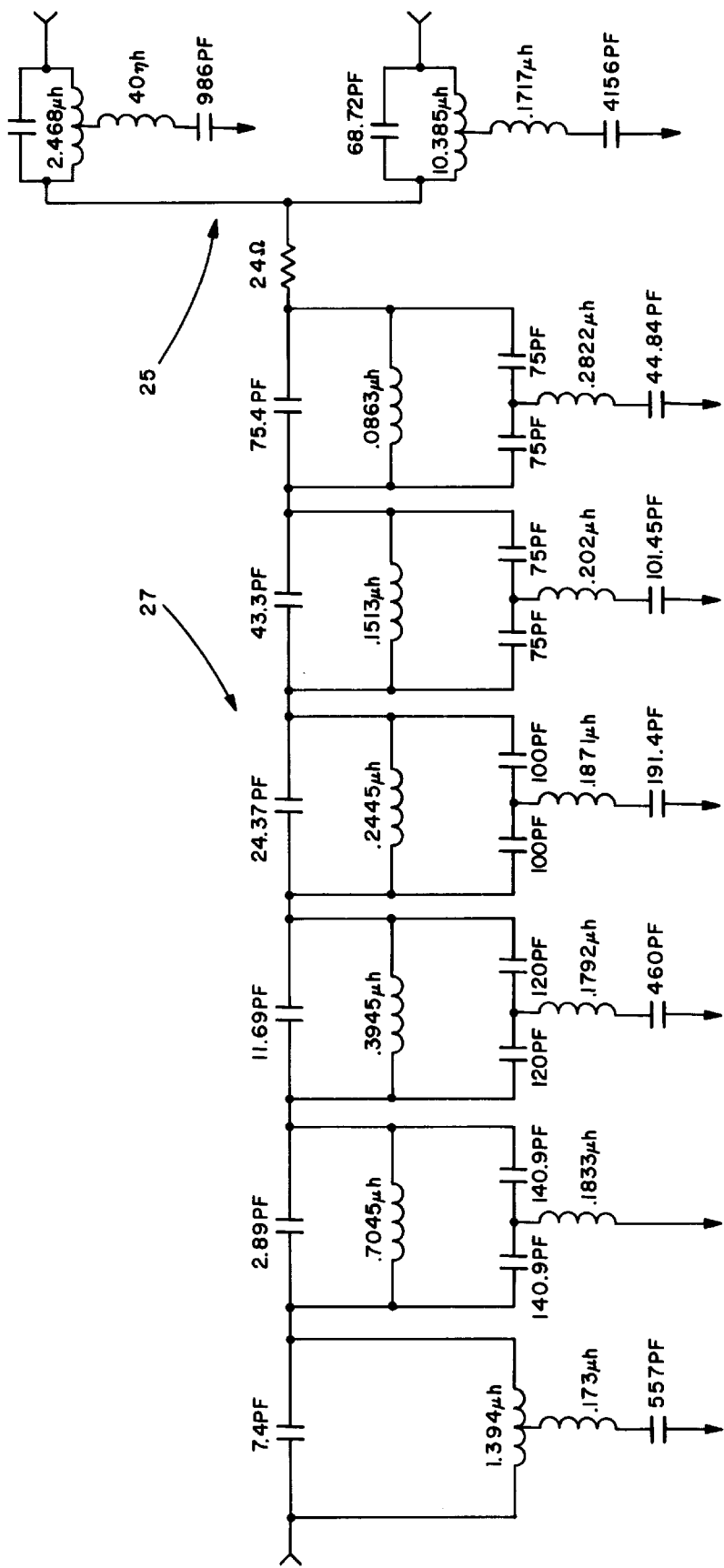
FIG. 2 is a schematic of a quadrature hybrid employed in the system of FIG. 1.

A composite signal containing the desired signal and two jamming signals is received at an input 10 and applied to a power divider 12 to split the signal into three paths. One path drives one input to a single-sideband modulator 16 via a delay 18. The second output from divider 12 is applied to the other input to single-sideband modulator 16 via an AM detector 14, a high-pass filter 20 and a video amplifier 22. The third output will be described later. Single-sideband modulator 16 is conventional with the exception that quadrature hybrid 26 for the video signal must be modified to have a substantially constant delay. Standard quadrature hybrids have a nonuniform delay characteristic and thus, because of the wideband nature of the video signal, compensation must be provided. A typical quadrature hybrid applicable to the present system is shown in FIG. 2 comprising a conventional quadrature hybrid 25 preceded by a compensating network 27 for linearizing the frequency versus delay characteristics.

The compensated quadrature hybrid shown was designed to cover a frequency range of 3 to 50 MHz.

In the instant example, single-sideband modulator 16 comprises a pair of quadrature hybrids 24, 26, one coupled to each input of modulator 16. One output from each hybrid 24, 26 is applied to a pair of balanced modulators 28, 30 with the outputs from the balanced modulators coupled to a 0/180° hybrid 32. The upper sidebands of the signal from single-sideband modulator 16 will appear at the sum output 34 thereof and the lower sidebands will appear at the difference output 36.

Since the jammer sweeps to both sides of the desired signal, the desired output will appear part of the time in each of the two outputs 34, 36 and therefore both must be processed. (If only one were processed, it would mean a 6 dB loss). Thus, to cancel the second jamming signal a second stage is provided for each of the outputs of the single-sideband modulator 16. Two jamming suppression circuits 38, 40 are coupled to the sum and difference outputs of modulator 16. These may be like that disclosed in Ser. No. 509,158 now U.S. Pat. No. 5,363,104 and described herein or like that disclosed in Ser. Nos. 446,570 abandoned and 491,587 pending or any other jamming cancellation circuit. The outputs from the jammer cancellation circuits are applied to a combiner 42. In the outputs of these second jammer cancellation stages the second jammer will have been suppressed and only the desired signal remains. To combine the outputs from jamming suppression circuits 38 and 40 a combiner control 44 is provided. Combiner control 44 permits combiner 42 to take the signal from jamming suppression circuit 40 when the frequency of the largest jamming signal is above the center frequency of the desired signal and from jamming suppression circuit 38 when the frequency of the largest jamming signal is below the center frequency of the desired signal, i.e., when a jamming suppressed circuit contains the desired signal and not its image. The output of combiner 42 is applied to the radar receiver, communication receiver, etc. The entire system described may be operated at either the r.f. or by translation and retranslation, at a convenient i.f.

Figure 3:
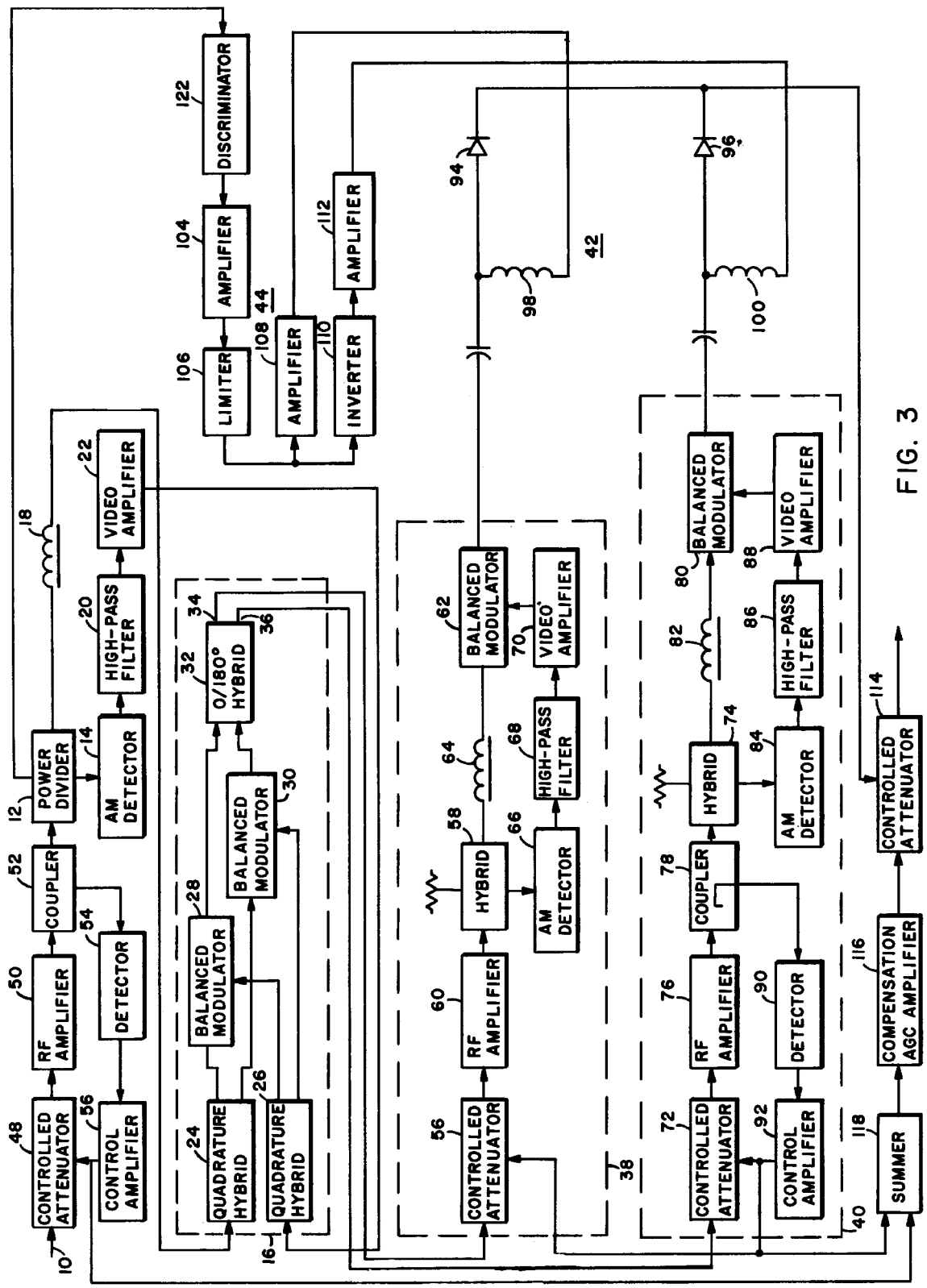
FIG. 3 is a more comprehensive illustration of the system of FIG. 1.

A more comprehensive illustration of the system of FIG. 1 is shown in FIG. 3. The signal at input 10, containing the desired signal plus two jamming signals, is applied to a controlled attenuator 48, such as a p-i-n diode attenuator. The output from controlled attenuator 48 is applied to an r.f. amplifier 50 and then to a coupler 52. Part of the signal from coupler 52 is applied to a diode detector 54 and via a control amplifier 56 is used to control the controlled attenuator 48. The elements 48, 50, 52, 54 and 56 constitute an AGC circuit which amplitude standardizes the input to power divider 12.

The signal at power divider 12 is divided into three paths. One path drives single-sideband modulator 16 via a delay 18 and a second is applied to modulator 16 via AM detector 18, high-pass filter 20 and video amplifier 22 as described in FIG. 1. The sum 34 and difference 36 outputs from single-sideband modulator 16 contain the desired signal plus the second jamming signal with the first jamming signal suppressed. These outputs are coupled to jamming suppressor circuits 38 and 40 to suppress the second jamming signal.

Jamming cancellation circuit 38 includes a controlled attenuator 56 which is coupled to a hybrid or other power divider 58 via an r.f. amplifier 60. The signal at hybrid 58 is coupled to one input of a balanced modulator 62 via a delay 64 and to the other input via an AM detector 66, high-pass filter 68 and video amplifier 70.

The difference output of single-sideband modulator 16 is applied to suppression circuit 40 which is very much like circuit 38 and includes a controlled attenuator 72 the output of which is applied to a hybrid or other power divider 74 via an r.f. amplifier 76 and coupler 78. The output from hybrid 74 is applied to one input of a balanced modulator 80 via a delay 82 and to the second input of balanced modulator 80 via an AM detector 84, high-pass filter 86 and video amplifier 88.

A portion of the signal from coupler 78 is applied to a diode detector 90 and then to a control amplifier 92. The output of control amplifier 92 is applied to both controlled attenuators 56 and 72 of jamming suppressor circuits 38 and 40 to provide an AGC function for both of these jamming suppression circuits.

Separate second stages 38 and 40 have been provided for the two outputs 34 and 36 of the single-sideband modulator 16. In the output of these second stages 38 and 40 the second jammer will have been suppressed and only the desired signal remains. But, it is still necessary to combine the outputs from stages 38 and 40 into a single output. This is accomplished in this embodiment by combiner 42 which may be any fast switching means such as a pair of diode switches 94 and 96 which are biased through a pair of chokes 98 and 106. The diode switches of combiner 42 are controlled from a combiner controller 44 which includes a discriminator 102 which receives its input from power divider 12. The output from discriminator 122 is applied to an amplifier 104 and its output is applied to a limiter 106. The output from limiter 106 is applied to choke 98 via an amplifier 108 and to choke 100 via an inverter 110 and amplifier 112. The discriminator detects when the largest jamming signal is above or below the center frequency of the desired signal and appropriately switches the outputs from the balanced modulators 62 and 80 accordingly.

The desired signal which is coupled from the diodes 94 and 96 is applied to a controlled attenuator 114 to compensate for the AGC previously inserted. Controlled attenuator 114 is driven by a compensation AGC amplifier 116 whose input is the summation of the AGC signals from control amplifier 56 and control amplifier 92, these being applied through a summer 118. The AGC compensation 116 and controlled attenuator 114 are used to restore the antenna pattern modulation lost by the AGC processing.

Figure 4:
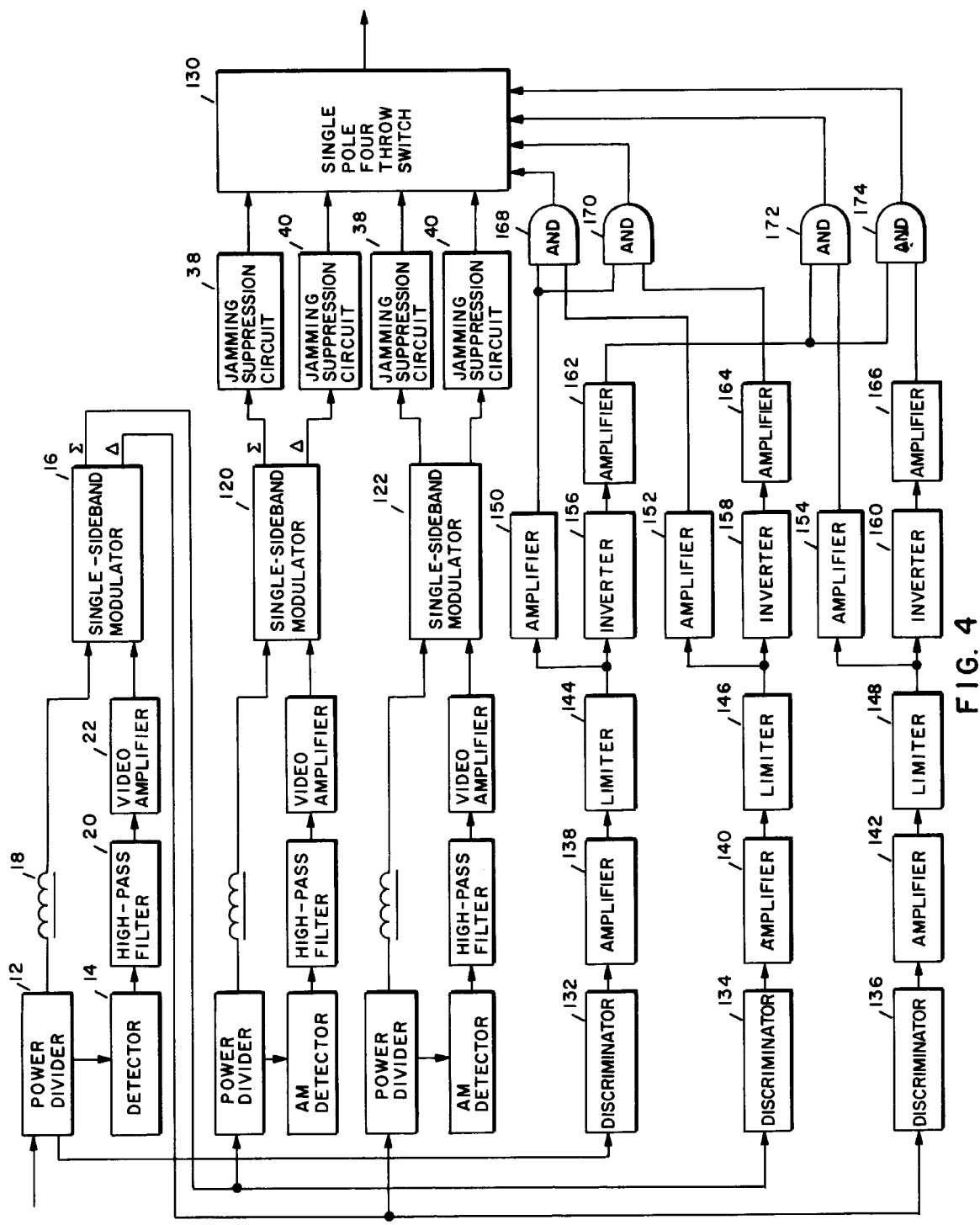
FIG. 4 is a block diagram of a system for handling more than two jammers.

When protection against more than two jammers is required additional single-sideband stages must be provided in the manner described in this application. For example, FIG. 4 illustrates one such system which will suppress three jammers. For clarity AGC, AGC compensation and other modifications to the circuit have not been included but would be provided in the manner taught herein. Although this system shows means for cancelling three jammers, the same techniques are applied for cancelling any number of jammers.

In the system of FIG. 4, the input signal is applied to a first single-sideband modulator 16 through a delay 18 and through an AM detector 14, high-pass filter 20 and video amplifier 22 as taught above. The sum and difference outputs of single-sideband modulator 16 are applied to jamming suppression circuits including single-sideband modulators 120 and 122 instead of jamming suppression circuits 38 and 40 as in FIG. 3. The sum output of single-sideband modulator 16 is applied directly through a delay to one input of single-sideband modulator 120 and through the AM detector chain to the other input. The difference output is likewise applied directly through a delay to one input of signal-sideband modulator 122 and through the AM detector chain to the other input. Therefore, the second jammer is suppressed by the jamming suppression circuits including single-sideband modulators 120 and 122.

The sum and difference outputs of the modulators 120 and 122 are applied to a pair of jamming suppression circuits 38 and a pair of jamming suppression circuits 40 like that shown in FIG. 3, and the outputs of circuits 38, 40 are combined using a single pole-four throw switch 130 which is driven by the outputs from three discriminators 132, 134 and 136 coupled respectively to the three chains including the single-sideband modulators 16, 120 and 122. The outputs from the discriminators 132, 134 and 136 are amplified by amplifiers 138, 140 and 142 with their outputs applied to limiters 144, 146 and 148. Two paths are coupled from each limiter, one directly through amplifiers 150, 152 and 154 and one inverted output through inverters 156, 158 and 160 amplifiers 162, 164 and 166. These are ANDed together in AND gates 168, 170 and 172 and 174 to provide the switching signals for a single-pole four throw switch 130 which preferably is like the single pole-two throw switch 42 other than having four diodes. The switch 130 is switched to one position if the frequencies of both jamming signals are higher than the center frequency of the desired signal, switch to a second position if one jamming signal is above and one below the center frequency, switched to a third position for the reverse and switched to a fourth position if the frequencies of both jamming signals are lower than the center frequency of the desired signal.

In the event the received signal contained fewer jamming signal than the number of jamming suppressions stages provided, the surplus stages would be bypassed as would the entire system in the event no jamming signals were received.

The present invention is useful in any signal processing system including radar and communication which are subject to multiple source jamming. The techniques are al so applicable to ECM application. For example, conventionally ECM jammers are periodically shut off so that an ESM receiver can look at the system which is being jammed to determine if it is still operating at the jamming frequency or at a different frequency, thus, requiring a shift in the jamming frequency. During this period the jammer aircraft is vulnerable since the radar is permitted a clear look. The present invention can be employed with such ESM receiver and, thus, eliminate the requirement of shutting off the jammers to accomplish look-through. In fact, continuous look-through can be achieved with a continuous monitoring of the radar frequency.

While the present invention has been described in conjunction with one particular jamming suppression circuit as described in Patent Application Ser. No. 509,158 now U.S. Pat. No. 5,363,104, the jamming cancellation systems of Ser. Nos. 446,570 abandoned and 491,587 pending as well as other jamming suppression systems may be employed. Thus, it is to be understood that the embodiments shown are illustrative only, and that many variations and modifications may be made without departing from the principles of the invention herein disclosed and defined by the appended claims.

We claim:

1. Apparatus for recovering a desired signal from an input signal which includes at least two jamming signals, a weaker jamming signal and a stronger jamming signal, comprising:

means having first and second outputs coupled to the input signal for generating the desired signal and its image on said first and second outputs and the weaker jammer signal and its image on said first and second outputs with the larger of the two jamming signals suppressed; and first and second jamming suppression circuits coupled, respectively, to the first and second outputs of said signal generating means for suppressing the weaker of the jamming signals.

2. Apparatus for recovering a desired signal from an input signal which includes noise jamming signals of higher intensity including at least a stronger and weaker jamming signal, comprising:

a single-sideband modulator;

means for applying a portion of the input signal to one input of said single-sideband modulator;

means for detecting the difference frequencies produced by the beating of the strongest jamming signal with the other signals;

means for applying said detected signals to the second input of said single-sideband modulator whereby the sum and difference outputs of said single-sideband modulator will contain the desired signal and the weaker jamming signal(s) with the strongest jamming signal suppressed; and first and second jamming suppression circuits coupled, respectively, to the sum and difference outputs of said single-sideband modulator for suppressing the weaker jamming signal.

3. Apparatus as defined in claim 1, further including means for combining the outputs from said first and second jamming suppression circuits such that the signal from said first jamming suppression circuit is processed when the frequency of said strongest jamming signal is above the center frequency of the desired signal and the signal from said second jamming suppression circuit is processed when the frequency of said strongest jamming signal is below the center frequency of the desired signal.

4. Apparatus as defined in claim 2, wherein said combining means includes a switching circuit coupled to said first and second jamming suppression circuits and means for actuating said switching circuit.

5. Apparatus as defined in claim 3, wherein said actuating means includes a discriminator coupled to said input signal for detecting when the frequency of said strongest jamming signal is above or below the center frequency of the desired signal.

6. Apparatus as defined in claim 1, wherein said single-sideband modulator has a substantially constant delay versus frequency characteristic at the frequencies of interest.

7. Apparatus as defined in claim 5, wherein said single-sideband modulator includes first and second quadrature hybrids coupled to the inputs thereof and a compensating circuit coupling the said detection means to said second input to adjust the delay versus frequency characteristic of said second quadrature hybrid to be substantially linear over the relatively wide frequency band of the signals applied thereto.

8. Apparatus as defined in claim 1, further including a video amplifier coupling said detecting means to said second input of said single-sideband modulator.

9. Apparatus as defined in claim 7, further including a high-pass filter coupling said detecting means to said video amplifier.

10. Apparatus as defined in claim 8, further including compensating means for equalizing the phase of the signals applied to said single-sideband modulator.

11. Apparatus as defined in claim 1, further including means for amplitude standardizing the input signal.

12. Apparatus as defined in claim 10, wherein said amplitude standardizing means includes an AGC control.

\* \* \* \* \*